(12) United States Patent
Horng et al.

(10) Patent No.: US 6,617,736 B1
(45) Date of Patent: Sep. 9, 2003

(54) AXLE TUBE STRUCTURE FOR A MOTOR

(75) Inventors: Alex Horng, Kaohsiung (TW);
Yin-Rong Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 10/079,551

(22) Filed: Feb. 22, 2002

(51) Int. Cl.⁷ ................................................ H02K 7/00
(52) U.S. Cl. .................... 310/91; 310/67 R; 310/90; 310/254; 310/217
(58) Field of Search .............................. 310/91, 67 R, 310/90, 254, 217; 360/99.08, 98.07, 99.04

(56) References Cited

U.S. PATENT DOCUMENTS

| | | | | |
|---|---|---|---|---|
| 5,436,519 A | * | 7/1995 | Takahashi et al. | 310/217 |
| 5,562,347 A | * | 10/1996 | Hsieh | 384/215 |
| 6,072,261 A | * | 6/2000 | Lin | 310/254 |
| 6,400,053 B1 | * | 6/2002 | Horng | 310/91 |
| 6,435,722 B1 | * | 8/2002 | Horng | 384/279 |

* cited by examiner

Primary Examiner—Nestor Ramirez
Assistant Examiner—Leda T. Pham
(74) Attorney, Agent, or Firm—Bacon & Thomas, PLLC

(57) ABSTRACT

An axle tube structure for a motor includes a casing having an axle tube. An inner periphery of the axle tube includes plural grooves each having an open upper end. An annular groove is defined in a bottom of the inner periphery of the axle tube. An engaging member includes a ring engaged in the annular groove of the axle tube and plural legs extending from the ring. Each leg is engaged in an associated one of the grooves of the axle tube.

14 Claims, 5 Drawing Sheets

AXLE TUBE STRUCTURE FOR A MOTOR

BACKGROUND OF THE INVENTION

1. Field of the Invention

The present invention relates to an axle tube structure for a motor. In particular, the present invention relates to an improved axle tube that allows easy, reliable assembly of all of the elements of a motor.

2. Description of the Related Art

A conventional miniature heat-dissipating fan, as illustrated in FIG. 8 of the drawings, includes a circuit board 90 on which an axle tube 91 is formed. A stator 92 includes a central hole 94 that is force-fitted around the axle tube 91. A bearing 93 is mounted in the axle tube 91. The axle tube 91 is made of plastic material and is integrally formed with a plastic casing. In order to accurately assemble the bearing 93, the inner periphery of the axle tube 93 is processed by lathing or drilling to form an axle hole with a precise dimension for allowing force-fitting with the bearing 93. However, such a manufacturing process is troublesome. In addition, the stator 92, after assembly, cannot be reliably retained in place. Further, since the bearing 93 would generate heat when the rotor turns, the axle tube 91 expands as a result of heat expansion. Thus, the bearing 93 and the stator 92 cannot obtain the required force-fitting engagement therebetween. As a result, the rotor cannot turn stably, and noise occurs accordingly. Further, the stator 92 and the axle tube 91 may even disengage from each other.

SUMMARY OF THE INVENTION

It is the primary object of the present invention to provide an axle tube structure for a motor, wherein a reliable assembly is obtained without the risk of disengagement after the stator is force-fitted around the axle tube.

It is the secondary object of the present invention to provide an axle tube structure for a motor, wherein the axle tube includes an axle hole for easy, reliable engagement with two bearings that are coaxially engaged with an inner periphery defining the axle hole of the axle tube. Thus, the motor turns more smoothly and the noise is reduced.

An axle tube structure for a motor in accordance with the present invention comprises a casing having an axle tube. An inner periphery of the axle tube includes plural grooves each having an open upper end. An annular groove is defined in a bottom of the inner periphery of the axle tube. An engaging member includes a ring engaged in the annular groove of the axle tube and plural legs extending from the ring. Each leg is engaged in an associated one of the grooves of the axle tube.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
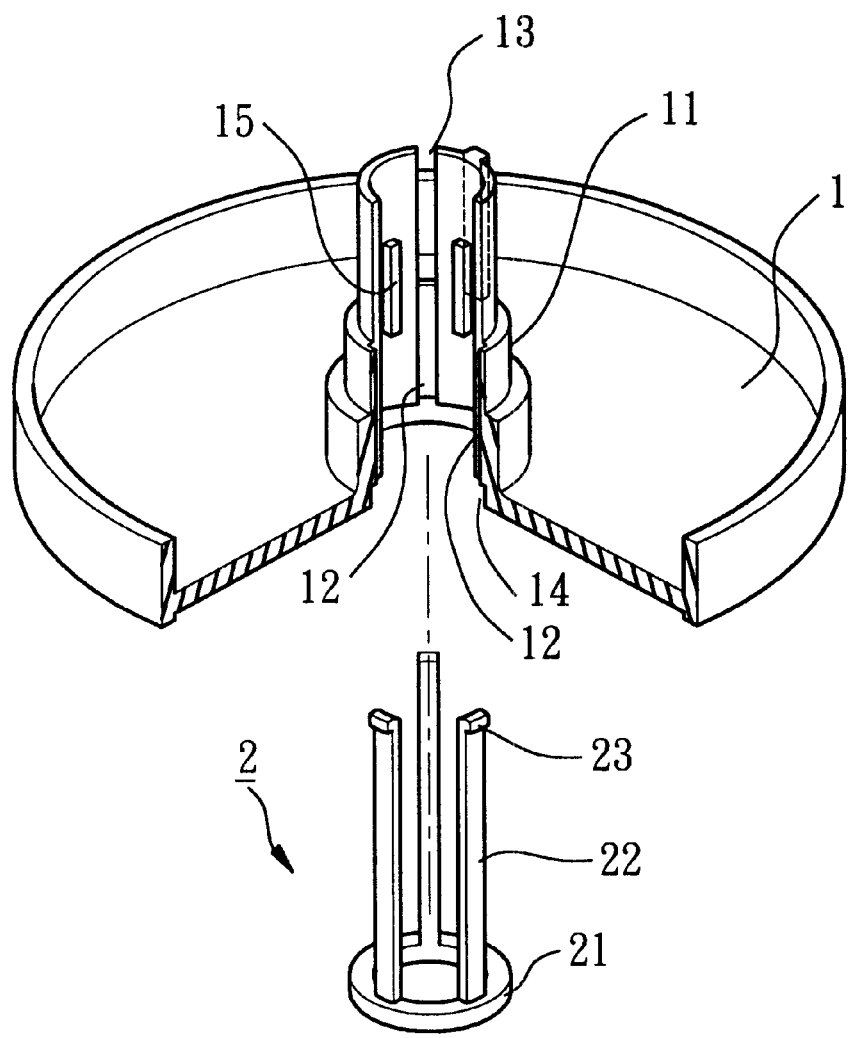
FIG. 1 is an exploded perspective view, partly cutaway, of an axle tube structure for a motor in accordance with the present invention.

Referring to FIG. 1, an axle tube structure in accordance with the present invention generally includes a casing 1 and an engaging member 2.

The casing 1 may be a casing for conventional motors, heat-dissipating fans, etc. The casing 1 includes an axle tube 11 that is integrally formed with the casing 1 of the same material. Thus, the axle tube 11 and the casing 1 are made of the same material, preferably plastics. The axle tube 11 includes an outer periphery around which a central hole 31 of a stator 3 (FIG. 4) is mounted. The outer periphery of the axle tube 11 may be of a single diameter throughout a length thereof or have a stepped configuration. The axle tube 11 includes an inner periphery having plural grooves 12. In this preferred embodiment, more than three grooves 12 are defined in the inner periphery of the axle tube 11 and spaced at regular angular intervals. Each groove 12 includes an open upper end 13. A lower end of each groove 12 extends to a bottom of the axle tube 11. The inner periphery of the axle tube 11 includes an annular groove 14 in a bottom thereof. At least one bearing 4 (FIG. 4) is mounted to the inner periphery of the axle tube 11. In a case that two bearings 4 are mounted in the axle tube 11, plural protrusions 15 are formed on the inner periphery of the axle tube 11 and located between the grooves 12. The protrusions 15 have upper sides located at the same level and lower sides located at the same level with the bearings 4 respectively abutting against both sides of the protrusions 15 on the inner periphery of the axle tube 11.

The engaging member 2 includes a ring 21 and plural legs 22 extending from a side of the ring 21. The ring 21 is engaged in the annular groove 14 in the bottom of the inner periphery of the axle tube 11. The legs 22 extend upright from the ring 21, and the number of the legs 22 of the engaging member 2 correspond to the number of the grooves 12 of the axle tube 11. Each leg 22 is resilient and located in an associated one of the grooves 12 with a distal end of the leg 22 slightly extending beyond the axle tube 11 via the open upper end 13 of the associated groove 12. The distal end of each leg 22 includes an outwardly extending engaging block 23 that extends to the outer periphery of the axle tube 11. Thus, the engaging blocks 23 retain the stator 3 in place.

Figure 2:
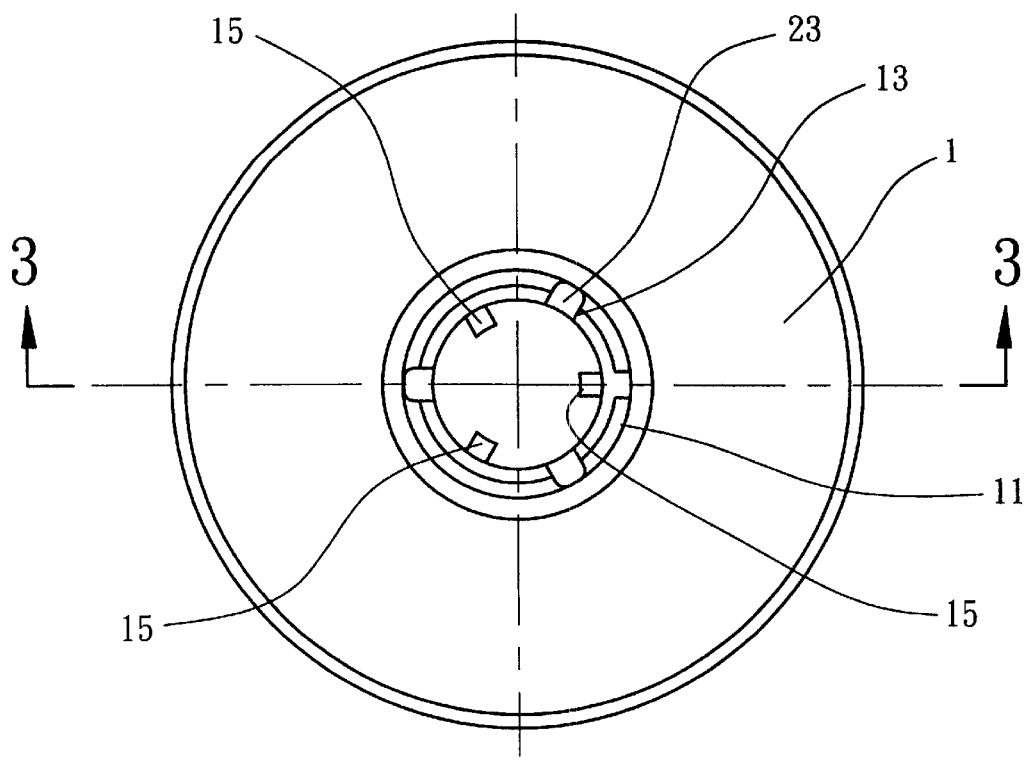
FIG. 2 is a top view of the axle tube in FIG. 1.
Figure 3:
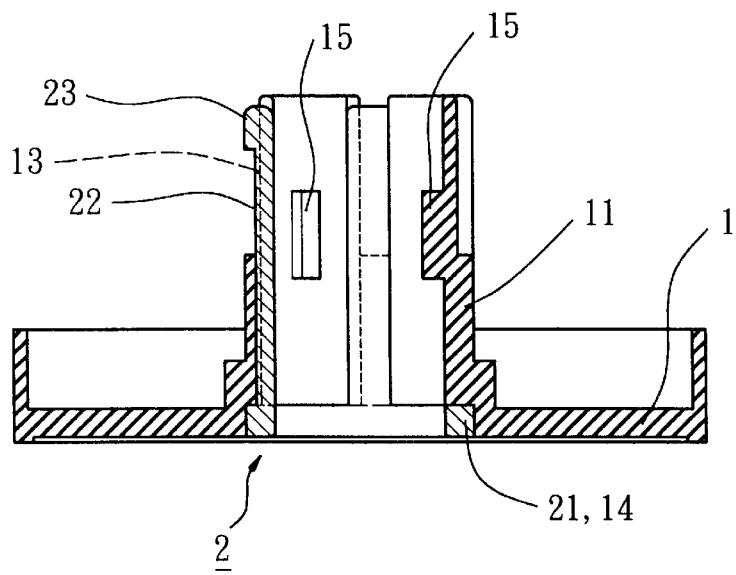
FIG. 3 is a sectional view taken along plane 3—3 in FIG. 2.

FIGS. 2 and 3 illustrate assembly between the casing 1 and the engaging member 2. The ring 21 of the engaging member 2 is engaged in the annular groove 14 in the bottom of the axle tube 11. The legs 22 are respectively positioned in the grooves 12 with the legs 22 being flush with the inner periphery of the axle tube 11 and with the engaging blocks 23 extending to the outer periphery of the axle tube 11.

Figure 4:
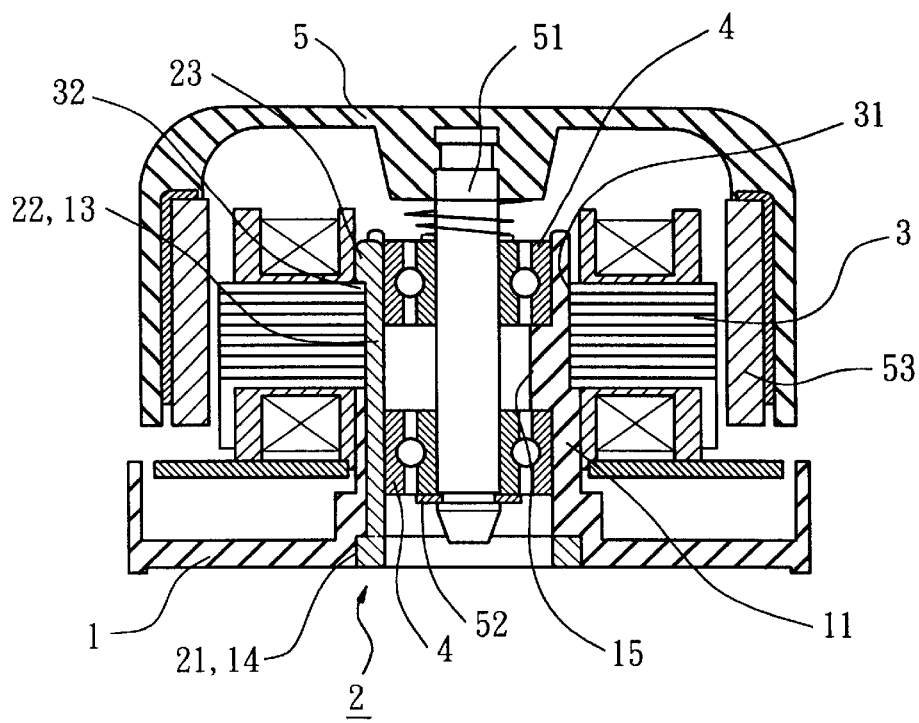
FIG. 4 is a sectional view of a first embodiment of a motor with the axle tube structure in accordance with the present invention.

FIG. 4 shows a first embodiment of assembly of a motor comprising the casing 1, the engaging member 2, a stator 3, two bearings 4, and a rotor 5. Two bearings 4 are mounted to the inner periphery of the axle tube 11 with the bearings 4 respectively abutting against upper and lower sides of the protrusions 15. The central hole 31 of the stator 3 is force-fitted to the outer periphery of the axle tube 11. The engaging blocks 23 of the legs 22 of the engaging member 2 are engaged on the uppermost one of the laminated silicon steel plates 32 of the stator 3 to thereby prevent disengagement of the stator 3 from the top. Further, shaft 51 of the rotor 5 is rotatably held in the bearings 4. In order to prevent disengagement of the lower bearing 14 on the lower side of the protrusions 15 and to prevent loosening of the rotor 5, a retainer 52 (such as a conventional C-clip) is mounted to a lower end of the shaft 51 that extends beyond the lower bearing 4. The elements of the motor are thus positioned. The rotor 5 includes a permanent magnet 53 for induction with the winding (not labeled) of the stator 3. The rotor 5 may include blades (not shown) to form a heat-dissipating fan.

Figure 5:
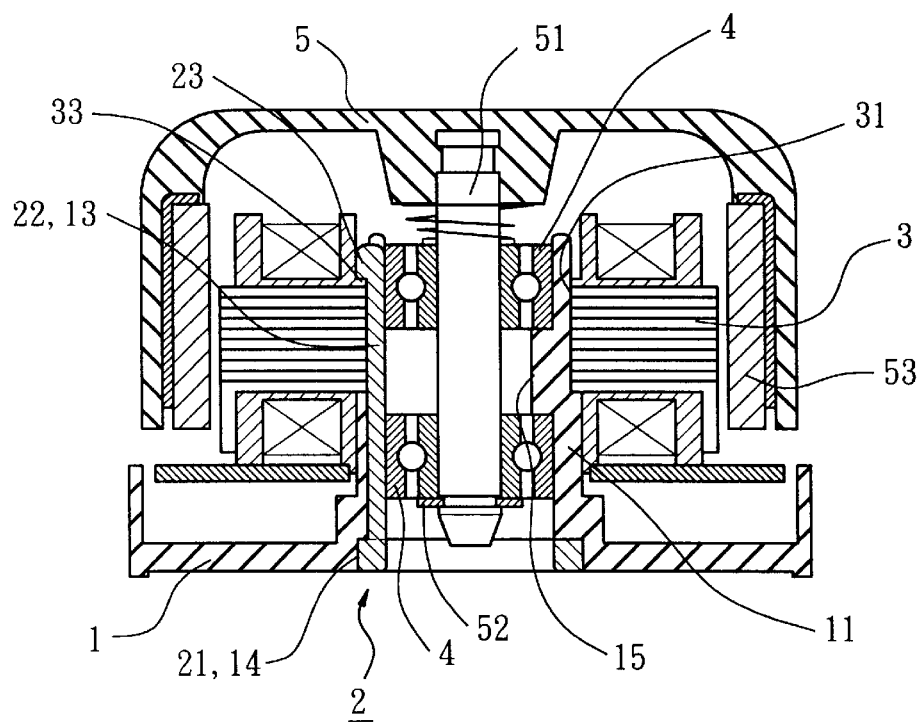
FIG. 5 is a sectional view of a second embodiment of the motor with the axle tube structure in accordance with the present invention.

FIG. 5 shows a second embodiment of assembly of the motor comprising the casing 1, the engaging member 2, a stator 3, two bearings 4, and a rotor 5. The central hole 31 of the stator 3 is force-fitted to the outer periphery of the axle tube 11. The engaging blocks 23 of the legs 22 of the engaging member 2 are engaged with an upper insulating sleeve 33 on top of the stator 3 to thereby prevent disengagement of the stator 3 from the top. Two bearings 4 are mounted to the inner periphery of the axle tube 11 with the bearings 4 respectively abutting against upper and lower sides of the protrusions 15. Further, shaft 51 of the rotor 5 is rotatably held in the bearings 4. In order to prevent disengagement of the lower bearing 14 on the lower side of the protrusions 15 and to prevent loosening of the rotor 5, a retainer 52 (such as a conventional C-clip) is mounted to a lower end of the shaft 51 that extends beyond the lower bearing 4. The elements of the motor are thus positioned.

Figure 6:
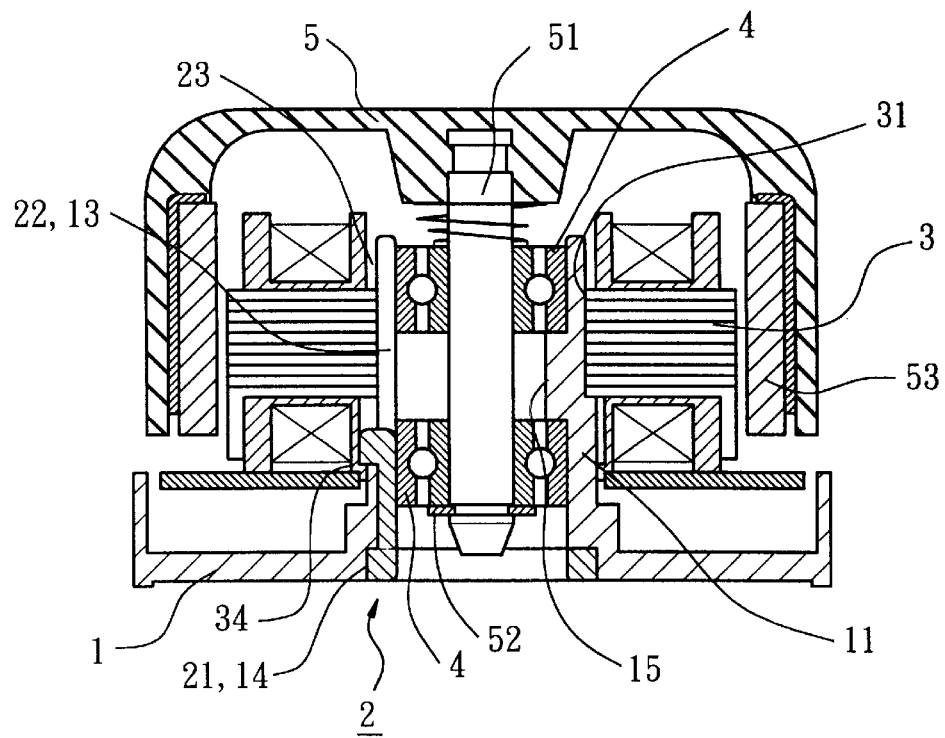
FIG. 6 is a sectional view of a third embodiment of the motor with the axle tube structure in accordance with the present invention.

FIG. 6 shows a third embodiment of assembly of the motor comprising the casing 1, the engaging member 2, a stator 3, two bearings 4, and a rotor 5. The central hole 31 of the stator 3 is force-fitted to the outer periphery of the axle tube 11. The legs 22 of the engaging member 2 are shorter. The engaging blocks 23 on the distal ends of the legs 22 of the engaging member 2 are engaged with a lower insulating sleeve 34 on a bottom of the stator 3 to thereby prevent disengagement of the stator 3 from the top. Two bearings 4 are mounted to the inner periphery of the axle tube 11 with the bearings 4 respectively abutting against upper and lower sides of the protrusions 15. Further, shaft 51 of the rotor 5 is rotatably held in the bearings 4. In order to prevent disengagement of the lower bearing 14 on the lower side of the protrusions 15 and to prevent loosening of the rotor 5, a retainer 52 (such as a conventional C-clip) is mounted to a lower end of the shaft 51 that extends beyond the lower bearing 4. The elements of the motor are thus positioned.

Figure 7:
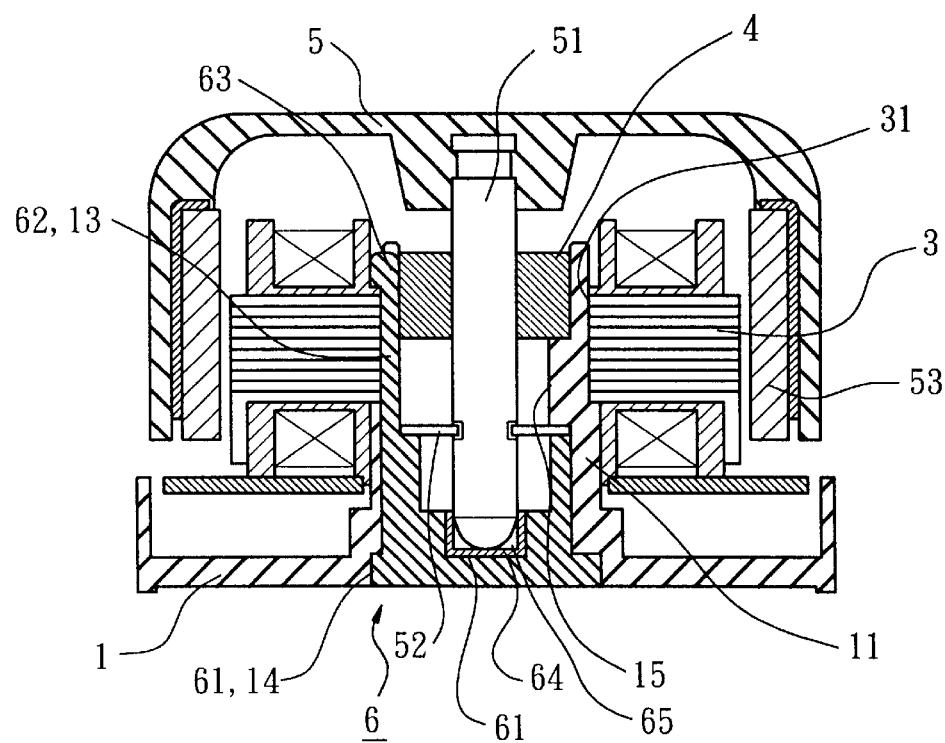
FIG. 7 is a sectional view of a fourth embodiment of the motor with the axle tube structure in accordance with the present invention.
Figure 8:
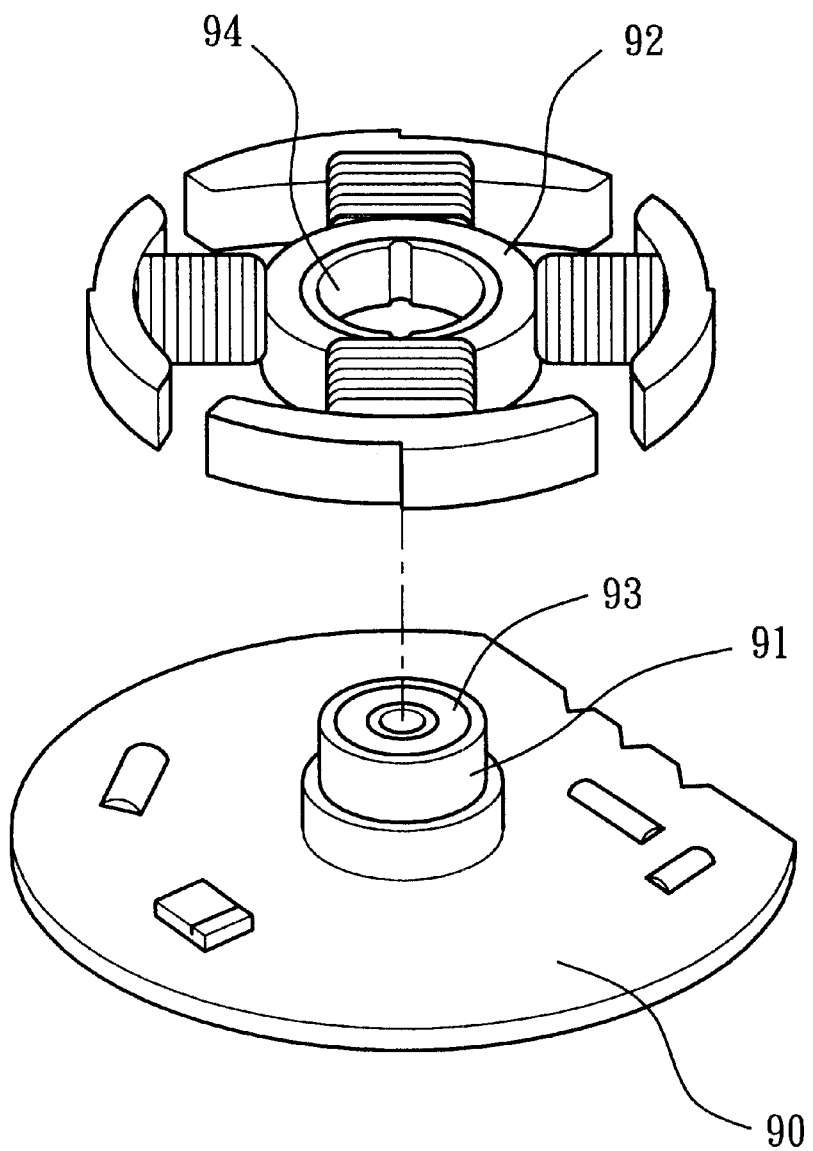
FIG. 8 is an exploded perspective view of a conventional axle tube structure.

FIG. 7 shows a fourth embodiment of assembly of the motor comprising the casing 1, an engaging member 6, a stator 3, a bearing 4, and a rotor 5. The engaging member 6 includes a solid bottom plate 61. A recess 64 is defined in a side of the bottom plate 61. Plural legs 62 extend from the side of the bottom plate 61 and each include an engaging block 63 on a distal end thereof. The central hole 31 of the stator 3 is force-fitted to the outer periphery of the axle tube 11. The engaging blocks 63 on the distal ends of the legs 62 of the engaging member 6 are engaged with an appropriate section of the stator 3 to thereby prevent disengagement of the stator 3 from the top. A bearing 4 is mounted to the inner periphery of the axle tube 11 with the bearing 4 respectively abutting against the upper side of the protrusions 15. Further, shaft 51 of the rotor 5 is rotatably held in the bearing 4. The bearing 4 may be a conventional self-lubricating bearing, oily bearing, or copper bearing. In order to prevent loosening of the rotor 5, a retainer 52 (such as a conventional C-clip) is mounted to a lower end of the shaft 51 that extends beyond the protrusions 4 and that rests on a bottom wall defining the recess 64 of the engaging member 6. If necessary, an abrasion-resistant member 65 is mounted in the recess 64 of the engaging member 6 for supporting the lower end of the shaft 51, thereby allowing smoother rotation of the shaft 51. Since the bottom plate 61 is solid, it could seal the bottom of the axle tube 11 to prevent leakage of the lubricating oil.

In accordance with the axle tube structure for a motor in accordance with the present invention, since the legs 22, 62 of the engaging member 2, 6 engaged in the grooves 12 of the axle tube 11 hold the bearing(s) 4 in he axle tube 11 and since the engaging blocks 23, 63 on the distal ends of the legs 22, 62 retain the stator in place, the whole stator is reliably positioned and thus would not be loosened resulting from heat expansion of the axle tube 11. The procedure for assembly and processing is simpler. In addition, during manufacture of the axle tube 11, since the shrinkage rates for different materials are different from one another and thus cause a tolerance in the inner diameter of the axle tube 11, the bearing(s) 4 mounted in the axle tube 11 are clamped and thus positioned by the resilient forces exerted by the legs 22, 62 of the engaging member 22, 62 due to limitation from the central hole 31 of the stator 3. Thus, appropriate, non-skew positioning of the bearings 4 is obtained such that the bearings rotate about the same rotational axis.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. An axle tube structure comprising:
    a casing comprising an axle tube having a hole, said hole of said axle tube including an inner periphery for receiving at least one bearing, and a lower end retaining portion, said inner periphery of said axle tube including plural grooves each having an open upper end; and
    a detachable engaging member comprising a ring and plural legs extending from said ring, said ring adapted to engage said lower end retaining portion of said axle tube with said plural legs being located in said grooves of said axle tube when said ring of the engaging member engages the lower end retaining portion of the casing.

2. The axle tube structure as claimed in claim 1, wherein said plural grooves of said inner periphery of said axle tube are spaced at regular angular intervals.

3. The axle tube structure as claimed in claim 1, wherein a number of said plural grooves is three, and wherein said three grooves are spaced at regular angular intervals.

4. The axle tube structure as claimed in claim 1, wherein said inner periphery of said axle tube further includes plural protrusions located between said plural grooves, said plural protrusions having upper sides located at the same level, said plural protrusions further having lower sides located at the same level.

5. The axle tube structure as claimed in claim 1, wherein each of said plural legs has a distal end slightly extending beyond said open upper end of an associated one of said plural grooves.

6. The axle tube structure as claimed in claim 1, wherein each of said plural legs has an engaging block on a distal end thereof, said engaging block extending outward to an outer periphery of said axle tube.

7. A motor comprising:

a casing comprising an axle tube having a hole, said hole of said axle tube including an inner periphery for receiving at least one bearing, and a lower end retaining portion, said inner periphery of said axle tube including plural grooves each having an open upper end; and a detachable engaging member comprising a ring and plural legs extending from said ring, said ring adapted to engage said lower end retaining portion of said axle tube with said plural legs being located in said grooves of said axle tube when said ring of the engaging member engages the lower end retaining portion of the casing;

a stator comprising a plurality of laminated silicon steel plates and a central hole, said central hole of said stator being mounted to an outer periphery of said axle tube and retained in place by resilient forces exerted by said plural legs of said engaging member;

at least one bearing mounted in the inner periphery of said axle tube; and a rotor including a shaft rotatably held by said at least one bearing, said rotor further including a permanent magnet for induction with said stator to thereby drive the rotor.

8. The motor as claimed in claim 7, wherein said inner periphery of said axle tube includes plural protrusions located between said plural grooves, said plural protrusions having upper sides located at the same level, said plural protrusions further having lower sides located at the same level, a number of said at least one bearing being two, a first one of said at least one bearing pressing against said upper sides of said plural protrusions, a second one of said at least one bearing pressing against said lower sides of said plural protrusions.

9. The motor as claimed in claim 7, wherein each of said plural legs of said engaging member includes an engaging block on a distal end thereof, said engaging blocks being engaged on an uppermost one of said laminated silicon steel plates of the stator.

10. A motor comprising:

a casing comprising an axle tube having a hole, said hole of said axle tube including an inner periphery for receiving at least one bearing, and a lower end retaining portion, said inner periphery of said axle tube including plural grooves each having an open upper end; and a detachable engaging member comprising a ring and plural legs extending from said ring, said ring adapted to engage said lower end retaining portion of said axle tube with said plural legs being located in said grooves of said axle tube when said ring of the engaging member engages the lower end retaining portion of the casing;

a stator comprising a central hole, said central hole of said stator being mounted to an outer periphery of said axle tube and retained in place by resilient forces exerted by said plural legs of said engaging member;

a bearing mounted in the inner periphery of said axle tube; and a rotor including a shaft rotatably held by said bearing, said rotor further including a permanent magnet for induction with said stator to thereby drive the rotor.

11. The motor as claimed in claim 7, wherein said stator further includes an upper insulating sleeve and a lower insulating sleeve for covering said laminated silicon steel plates, each of said plural legs of said engaging member including an engaging block on a distal end thereof, said engaging blocks being engaged on said lower insulating sleeve.

12. The motor as claimed in claim 7, wherein said rotor includes blades to form a heat-dissipating fan.

13. A motor comprising:

a casing comprising an axle tube having a hole, said hole of said axle tube including an inner periphery for receiving at least one bearing, said inner periphery of said axle tube including plural grooves each having an open upper end;

an engaging member comprising a solid bottom plate and plural legs extending from said solid bottom plate, said solid bottom plate being secured to a bottom of said axle tube with said plural legs being located in said grooves of said axle tube;

a stator comprising a central hole, said central hole of said stator being mounted to an outer periphery of said axle tube and retained in place by resilient forces exerted by said plural legs of said engaging member;

a bearing mounted to the inner periphery of said axle tube; and a rotor including a shaft rotatably held by said at least one bearing, said rotor further including a permanent magnet for induction with said stator to thereby drive the rotor.

14. The motor as claimed in claim 13, wherein the solid bottom plate includes a recess for receiving an abrasion-resistant member, said shaft of said rotor including an end that rotatably rests on said abrasion-resistant member.

* * * * *